UNITED STATES PATENT OFFICE.

WILLIAM TATHAM, OF PHILADELPHIA, PENNSYLVANIA.

PROTECTING PLUMBAGO CRUCIBLES.

SPECIFICATION forming part of Letters Patent No. 281,159, dated July 10, 1883.

Application filed May 4, 1883. (No specimens.)

*To all whom it may concern:*

Be it known that I, WILLIAM TATHAM, a citizen of the United States, and a resident of Philadelphia, Pennsylvania, have invented certain Improvements in Protecting Plumbago Crucibles, of which the following is a specification.

The object of my invention is to prevent the rapid destruction of the plumbago retorts and crucibles used in various metallurgical operations, and this object I attain in the manner hereinafter set forth.

What are known as "plumbago" retorts and crucibles are made of a mixture of black lead (carbon in the form of graphite) and fire-clay in varying proportions, and are generally subjected to high temperatures, as in melting steel or brass, or separating the alloy of zinc, silver, and lead obtained in the process of desilverization of lead by zinc. These crucibles are rapidly destroyed, owing to the burning out of the plumbago or carbon, the fire-clay being left behind as a porous and more or less friable mass, which readily combines and forms a slag with the ashes or cinders from coke or coal. The burning out of the carbon is due to two causes: first, the presence of oxygen or atmospheric air; and, second, the presence of carbonic acid—the product of combustion in the furnace. To obviate this difficulty, therefore, I propose to provide each crucible with an envelope impervious to air or gas and capable of resisting the heat to which the crucible is subjected.

In carrying out my invention I apply to the outside of the crucible a mixture which, on the application of heat, will form a vitrified coating, which adheres firmly to the retort and protects the latter from the destructive influences due to the action of air or gas or the heated retort. Various compounds may be used for the purpose, the following conditions being observed: The compound must not be such that it will flow off the crucible when melted. It must vitrify on the application of heat, and it must be of such a nature that it will not be destroyed by heat, and will not combine readily with the ashes or cinders from the fire to form slag.

The following are two mixtures which I have found to give good results in practice when subjected to such temperatures as those reached in separating the alloy of silver, zinc, and lead, above referred to: The first mixture comprises asbestus, one part, by weight; raw fire-clay, four parts, by weight; old fire-brick, (ground,) two parts, by weight; soluble silicate of soda or potash, six parts, by weight. To this is added a little water, to reduce the compound to the consistency of mortar. The second mixture comprises asbestus, two parts, by weight; litharge, one part, by weight; raw fire-clay, one part, by weight; powdered glass, one part, by weight; old fire-brick, (ground,) one part, by weight. The asbestus, besides aiding the composition to resist the destructive effects of the fire, serves as a binder to prevent the fire-clay from cracking when subjected to heat, and before the vitrifiable ingredient of the compound becomes fused.

The above compounds are simply given as examples, and my invention is not limited thereto.

When the crucible is to be subjected to a very high temperature—such as that employed in melting steel, for instance—I find it necessary to add a certain portion of alumina to the compound for the following reason: The value of a fire-clay or a compound having fire-clay as a base, as regards its ability to resist intense heat, depends upon the relative proportions of alumina and silica contained therein and upon the proportion of other bases, such as soda, iron, potash, &c., which may be called "fluxes." The more alumina in proportion to silica contained in the clay or compound the more refractory will be the same, and, on the other hand, the more flux contained in the clay or compound the less heat will it withstand. The addition of asbestus and vitrifiable ingredients to fire-clay causes proportions of alumina, silica, and flux in the compound very different from those which existed in the fire-clay; hence, when the compound is intended to resist very high temperatures, I add to it sufficient alumina to properly temper it—that is to say, to correct the loss of refractory quality, due to the excess of silica and fluxes. The amount of alumina to be added will depend upon the character of clay used, upon the proportions of asbestus, soluble silicate, &c., mixed therewith, and upon the heat which the compound is intended to withstand. The alumina may be in the form of the alumina hydrate of commerce, or it may be the mineral known as "bauxite," which is a hydrate of alumina with varying quantities of iron and silica and about twenty per cent. water. The bauxite used is the white variety, which is the purest, and is preferably calcined.

I am aware that asbestus has been added to clay in the manufacture of heat-resisting bricks, and also that it has been proposed to glaze crucibles to render them damp-proof, and hence claim neither of these things; but

I claim as my invention—

1. The within-described compound for forming a protecting-coating for crucibles, the same comprising fire-clay, asbestus, and an ingredient which will become vitrified on the application of heat, as set forth.

2. The within-described compound for forming a protecting-coating for crucibles, the same comprising asbestus, soluble silicate, and fire-clay, as specified.

3. The within-described compound for forming a protecting-coating for crucibles, the same comprising fire-clay, asbestus, a vitrifiable ingredient, and alumina, as set forth.

In testimony whereof I have signed my name to this specification in the presence of two subscribing witnesses.

WILLIAM TATHAM.

Witnesses:
HARRY L. ASHENFELTER,
HARRY SMITH.